US012687191B2

(12) United States Patent
Coronado et al.

(10) Patent No.: US 12,687,191 B2
(45) Date of Patent: Jul. 21, 2026

(54) FLOATING NUT PLATE QUARTER TURN FASTENER RECEPTACLE

(71) Applicant: Textron Aviation Inc., Wichita, KS (US)

(72) Inventors: Rodolfo Coronado, Wichita, KS (US); Ryan Lee McComber, Wichita, KS (US); Jesse Scott Weiss, Wichita, KS (US)

(73) Assignee: Textron Aviation Inc., Providence, RI (US)

( * ) Notice: Subject to any disclaimer, the term of this patent is extended or adjusted under 35 U.S.C. 154(b) by 394 days.

(21) Appl. No.: 18/417,699

(22) Filed: Jan. 19, 2024

(65) Prior Publication Data

US 2025/0237258 A1     Jul. 24, 2025

(51) Int. Cl.
*F16B 37/04* (2006.01)

(52) U.S. Cl.
CPC ............ *F16B 37/042* (2013.01); *F16B 37/04* (2013.01); *F16B 37/044* (2013.01)

(58) Field of Classification Search
CPC ...... F16B 37/04; F16B 37/041; F16B 37/042; F16B 37/044; F16B 37/045; F16B 37/046; F16B 37/062
USPC ................................. 411/955, 965, 969, 970
See application file for complete search history.

(56) References Cited

U.S. PATENT DOCUMENTS

| | | | | |
|---|---|---|---|---|
| 2,886,872 | A | * 5/1959 | D'Amelio ................. | F16B 5/10 |
| | | | | 411/965 |
| 3,729,040 | A | * 4/1973 | Whiteside ............. | F16B 37/042 |
| | | | | 411/968 |
| 4,285,379 | A | 8/1981 | Kowalski | |
| 8,277,158 | B2 | 10/2012 | Csik et al. | |
| 8,353,649 | B2 | 1/2013 | Csik et al. | |
| 8,740,152 | B1 | 6/2014 | Lyon et al. | |
| 9,435,369 | B2 * | 9/2016 | Deck ........................ | F16B 39/24 |
| 11,781,585 | B2 * | 10/2023 | Nijdam ................. | F16B 37/046 |
| | | | | 411/349 |
| 2003/0091408 | A1 | 5/2003 | Toosky | |
| 2009/0103997 | A1* | 4/2009 | Csik ...................... | F16B 37/045 |
| | | | | 411/112 |
| 2016/0091011 | A1* | 3/2016 | Deck ..................... | F16B 37/043 |
| | | | | 29/446 |
| 2021/0396263 | A1* | 12/2021 | Nijdam ................. | F16B 37/046 |
| 2023/0417270 | A1* | 12/2023 | Beyer ................... | F16B 5/0642 |

FOREIGN PATENT DOCUMENTS

CN          102966655 A      3/2013

* cited by examiner

*Primary Examiner* — Nicholas L Foster
(74) *Attorney, Agent, or Firm* — Avek IP, LLC

(57) ABSTRACT

A floating nut plate quarter turn fastener receptacle configured for fastening two structures together is disclosed. The quarter turn fastener includes a basket portion with flanges configured to loosely retain a nut element. The nut element is able to glide or shift between the flanges of the basket portion. The nut element includes an aperture and a wire recessed into a channel which intersects the aperture. The nut element is able to be moved within the flanges for aligning the aperture with a corresponding aperture through the basket portion, thereby enabling a fastening device to be inserted through both apertures and twisted a quarter turn for securing to the wire and fastening two structures together.

18 Claims, 9 Drawing Sheets

FLOATING NUT PLATE QUARTER TURN FASTENER RECEPTACLE

BACKGROUND OF THE INVENTION

1. Field

The disclosed embodiments relate generally to the field of nut plates. More specifically, the disclosed embodiments relate to floating nut plates and quarter turn fasteners.

2. Description of the Related Art

It is known for a nut plate to include a floating receiver with a hole to insert a screw. For example, U.S. Pat. No. 8,277,158 to Csik et al. discloses a floating nut assembly with a housing to keep a threaded nut element in position with flanges configured on a receiver.

It is also known for a nut element to include a quarter turn receptacle. For example, U.S. Pat. No. 8,353,649 to Csik et al. discloses a quarter turn receptacle used as a fastening element.

It is also known to have a rivetless nut plate including nut and holding bracket. For example, U.S. Patent Application Publication No. 2003/0091408 to Toosky discloses a nut with a holding bracket and retaining element.

SUMMARY

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages will be apparent from the following detailed description of the embodiments and the accompanying drawing figures.

In some embodiments, the techniques described herein relate to a floating nut plate quarter turn fastener receptacle, including: a basket portion having a first aperture and a plurality of flanges, wherein the first aperture is centrally located through the basket portion and the plurality of flanges extend upwards from an outer edge of the basket portion; a nut element having a second aperture and a channel, wherein the second aperture is centrally located through the nut element and the channel extends longitudinally through the nut element, the nut element being secured within the flanges of the basket portion such that the second aperture substantially aligns with the first aperture, the flanges being configured to allow the nut plate to be loosely retained upon the basket portion between the flanges; and a wire inserted into the channel, wherein the wire is configured to receive a slot of a fastener.

In some embodiments, the techniques described herein relate to a floating nut plate quarter turn fastener receptacle, including: a basket portion wherein the basket portion includes a first pair of flanges, a second pair of flanges, and a first aperture; a nut element wherein the nut element includes a channeled groove and a second aperture; a wire wherein the wire is fit into the channeled groove and intersects the second aperture; and the first pair of flanges being opposed to the second pair of flanges such that the nut element is retained within the first and second pairs of flanges.

BRIEF DESCRIPTION OF THE SEVERAL VIEWS OF THE DRAWINGS

Illustrative embodiments are described in detail below with reference to the attached drawing figures, which are incorporated by reference herein and wherein.

Figure 1:
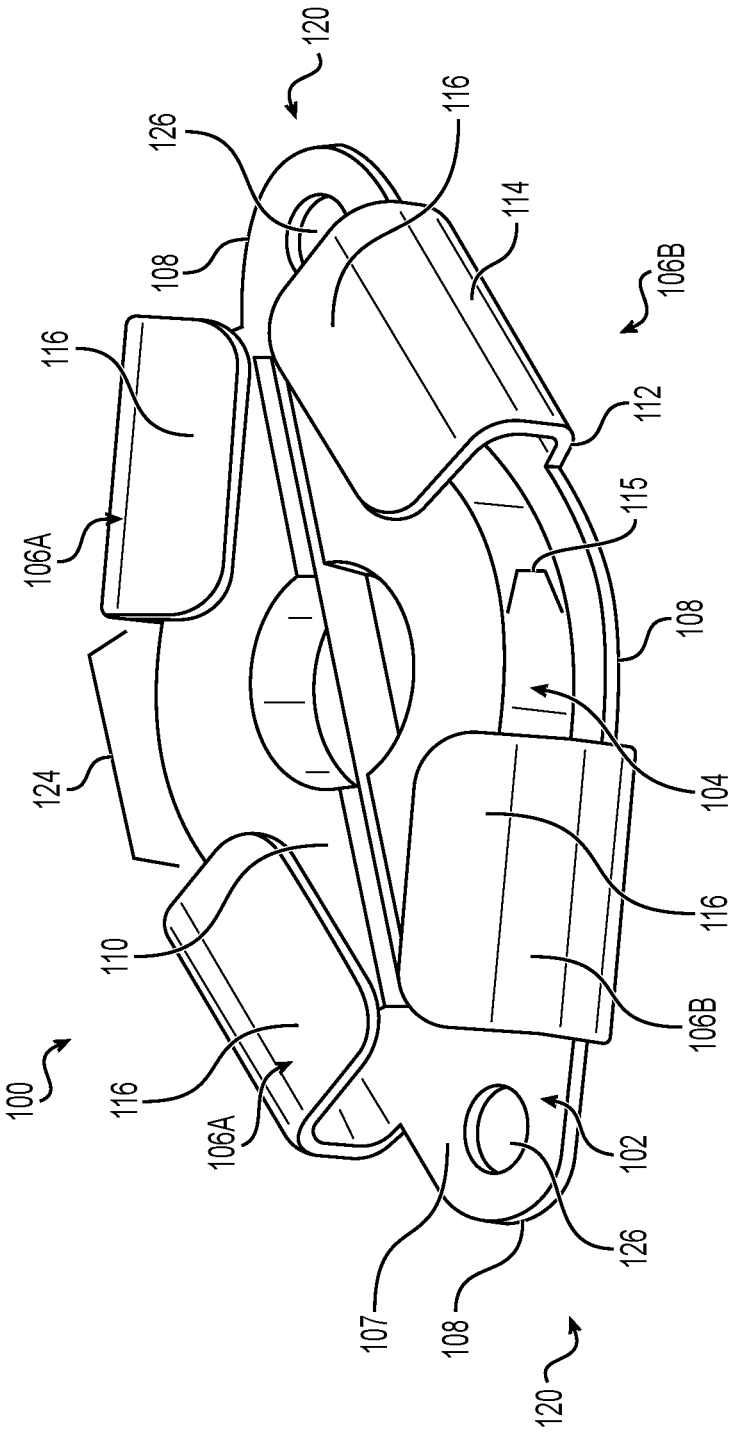
FIG. 1 is a perspective view of the fastener nut plate quarter turn fastener receptacle.

The drawing figures do not limit the invention to the specific embodiments disclosed and described herein. The drawings are not necessarily to scale, emphasis instead being placed upon clearly illustrating the principles of the invention.

DETAILED DESCRIPTION

The following detailed description references the accompanying drawings that illustrate specific embodiments in which the invention can be practiced. The embodiments are intended to describe aspects of the invention in sufficient detail to enable those skilled in the art to practice the invention. Other embodiments can be utilized and changes can be made without departing from the scope of the invention. The following detailed description is, therefore, not to be taken in a limiting sense. The scope of the invention is defined only by the appended claims, along with the full scope of equivalents to which such claims are entitled.

In this description, references to "one embodiment," "an embodiment," or "embodiments" mean that the feature or features being referred to are included in at least one embodiment of the technology. Separate references to "one embodiment," "an embodiment," or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the technology can include a variety of combinations and/or integrations of the embodiments described herein.

Floating nut plates are often used in manufacturing processes and are designed to accept a wider range of tolerances of fastener hole placement due to the adjustability or "float" of the nut element to align with the fastener hole in a structure. The floating nut element allows for fastening holes to be formed into a structure at a wider range of tolerance or deviation due to the allowed movement of the nut element to align with a fastener hole. Floating nut elements often require a screw to secure one structure to another. The use of screws may present difficulties and be overly time consuming upon installation.

Quarter turn fasteners are often used in manufacturing processes and are typically quicker and easier to install than screws. A quarter turn fastener sometimes includes a wire configured to engage with a slot of a fastener which may secure structures together when the fastener is rotated approximately a quarter turn. Quarter turn fasteners typically have limited adjustability when being aligned with a hole on a structure resulting in a narrow range of tolerance when holes are being formed into a structure. A solution is needed which combines the adjustability of the floating nut element and the quick installation of the quarter turn fastener.

Embodiments disclosed herein provide a floating nut plate quarter turn fastener receptacle. The floating nut plate quarter turn fastener receptacle includes a floating nut element having a quarter turn fastener receptacle configured to receive a fastener stud. The stud interacts with a wire integrated within the quarter turn fastener receptacle when the stud is rotated approximately a quarter turn, thereby securing the receptacle and the stud together. The floating nut plate quarter turn fastener receptacle includes flanges configured to secure the quarter turn receptacle nut plate while allowing a position of the nut element to "float" (i.e., shift or slide) within the flanges.

FIG. 1 shows a perspective view of a floating nut plate quarter turn fastener receptacle 100, which may be referred to herein as the nut plate fastener receptacle 100. The nut plate fastener receptacle 100 includes a basket portion 102 and a nut element 104. The basket portion 102 includes flanges 106 which extend away from the basket portion 102 and curve to partially wrap over an upper surface 110 of the nut element 104. In embodiments, the flanges 106 include two flange pairs 106A and 106B as depicted in FIG. 1. Each flange of the two flange pairs 106A, 106B extends from an outer edge 108 of the basket portion 102 upwards and over an upper surface 110 of the nut element 104. Each flange of the pairs 106A and 106B includes a first portion 112 laterally extending away from the outer edge 108 and curving to a second portion 114 vertically extending upwards a distance greater than a thickness 115 of the nut element 104. The second portion 114 leads to a third portion 116 which curves perpendicularly away from the second portion 114 and laterally extends over the upper surface 110 of the nut element 104. In embodiments, the flanges 106 curved shape formed from the first portion 112, the second portion 114, and the third portion 116 has an inner diameter greater than the thickness of the nut element 104. The thickness 115 of the nut element 104 may vary from one embodiment to another and may be dependent on the length of the fastener (FIG. 5C) used. The thickness 115 may be approximate to a stack of one or many washers.

Figure 2:
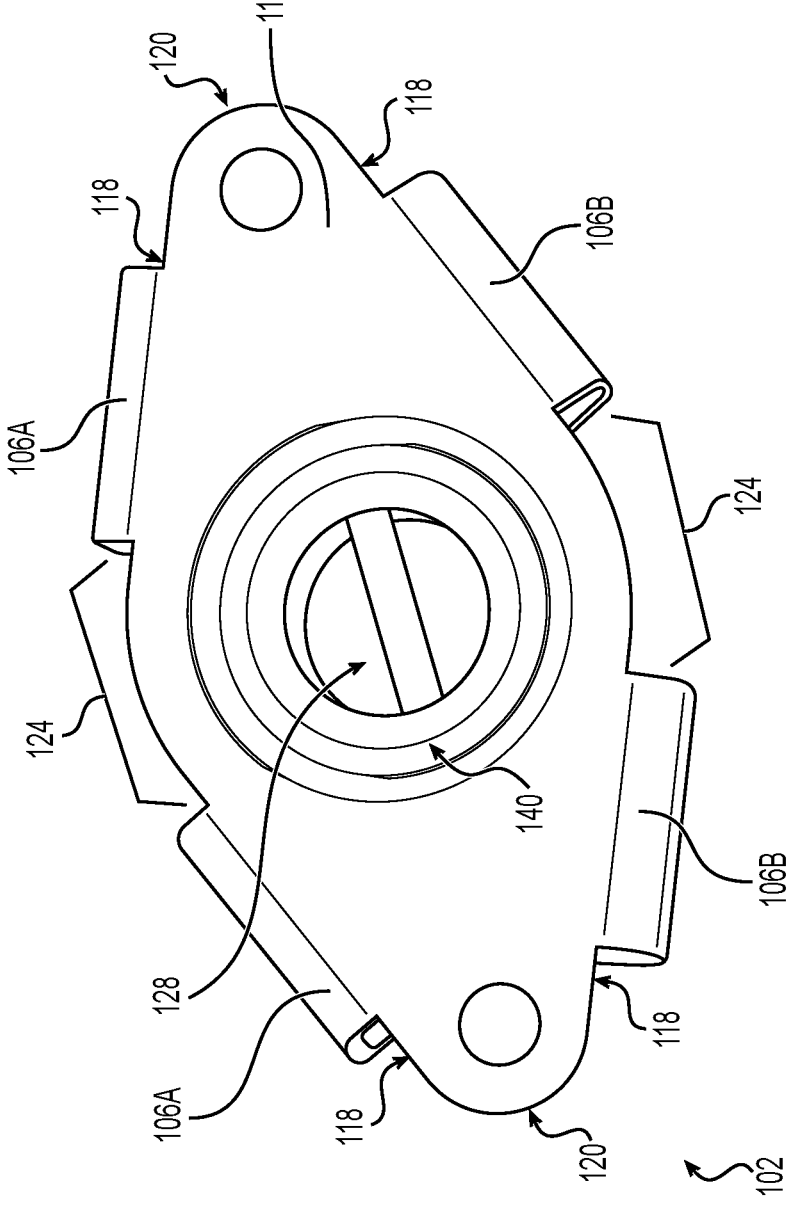
FIG. 2 is a perspective view of a bottom surface of a basket portion of the nut plate fastener receptacle of FIG. 1.

FIG. 2 shows a bottom perspective view of the nut plate fastener receptacle 100 showing the bottom surface 111 of the basket portion 102. The basket portion 102 of the nut plate fastener receptacle 100 in embodiments is generally elliptically shaped but having four angled sides 118 and two rounded ends 120. The basket portion 102 is the widest near its longitudinal center and the narrowest at opposite rounded ends 120. Each rounded end 120 connects angled sides 118 on opposites sides of the basket portion 102. The flanges 106A and 106B are positioned on the outer edge 108 of each of the four angled sides 118. The flanges are positioned such that a first pair of flanges 106A are positioned opposite from a second pair of flanges 106B on the outer edge 108 of the basket portion 102 with a gap 124 being created between each of the flange pairs 106A and 106B.

Returning to FIG. 1 the third portion 116 of each flange of the flange pairs 106A and 106B extends towards the flange positioned on the opposite angled side 118 of the basket portion 102. For instance, each flange 106A or 106B in the flange pair 106A extends towards each flange 106A or 106B in the flange pair 106B. Each flange 106A or 106B is positioned on the outer edge 108 of the sides 118 such that the gap 124 created between the flange pairs 106A and 106B does not allow for the nut element 104 to slide through the gap 124 between either pair of flanges 106A and 106B. The lateral extension of the third portion 116 of the flange pairs 106A and 106B and the length of the gap 124 between the flange pairs 106A and 106B allows for the nut element 104 to be substantially secured onto the basket portion 102. The basket portion 102 includes mounting holes 126 positioned at each of the ends 120. Each end 120 is shaped to curve around each mounting hole 126. The mounting holes 126 allow for a fastener such as a rivet to be inserted through the basket portion 102 to secure the nut plate fastener receptacle 100 to a structure which may be a sheet (e.g., a metal sheet). In embodiments, the basket portion 102 and the extending flange pairs 106A and 106B may be formed as a single piece and in some embodiments the flange pairs 106A and 106B may be mounted or adhered to the basket portion 102.

Returning to FIG. 2 the basket portion 102 includes an aperture 128 substantially near the center of the basket portion 102 in between the two opposing gaps 124. The aperture 128 is sized to be slightly larger than an outer diameter of a fastener stud 511 (FIG. 5C)

Figure 3:
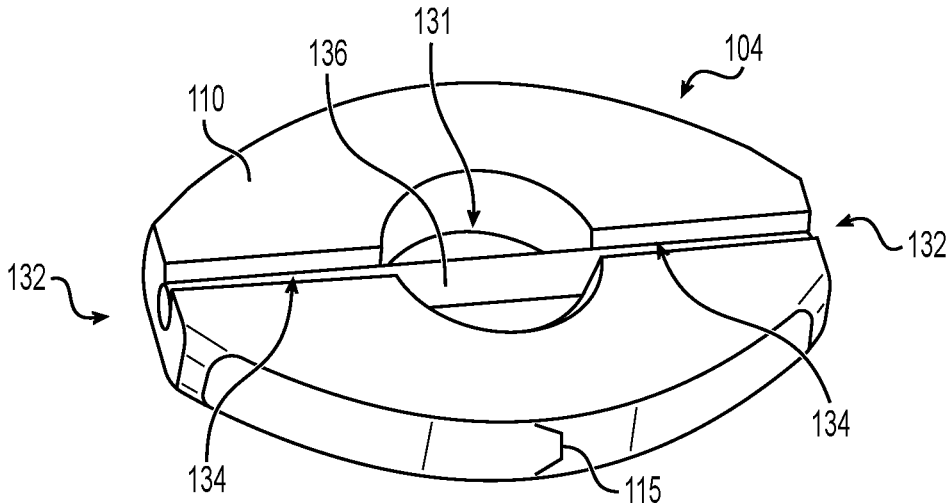
FIG. 3 is a perspective view of an upper surface of a nut element of the nut plate fastener receptacle.

FIG. 3 shows a top perspective view of the nut element 104 removed from the basket portion 102. The nut element 104 is elliptically shaped in embodiments with the nut element 104 being the widest near its center and narrowest at each of its ends 132. An aperture 131 is configured near the center of the upper surface 110 of the nut element 104. In embodiments, the aperture 131 is circular and has a diameter less than the diameter of the aperture 128. A channel 134 is recessed into the upper surface 110 of the nut element 104 and spans longitudinally from each end 132 throughout the length of the nut element 104 and intersecting through the relative center of the aperture 131. The channel 134 is recessed to a depth such that a wire 136 may be pressed into the recessed area of the channel 134. The wire 136 has a length which spans the channel 134 extending through the center of the aperture 131. The wire 136 in embodiments may be made substantially secure within the channel 134 by being pressed into the channel 134. In some embodiments, the wire 136 may be retained by other means such as over-molding the nut element 104 such that the wire 136 is substantially molded into the channel 134.

Figure 4:
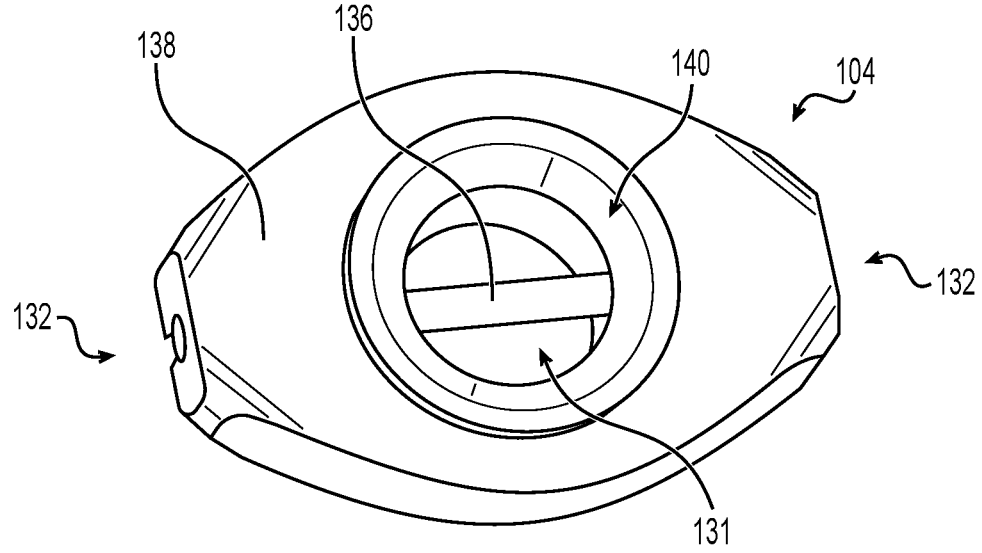
FIG. 4 is a perspective view of a bottom surface of the nut element of FIG. 3.

FIG. 4 shows a bottom perspective view of the nut element 104 removed from the basket portion 102. The nut element 104 includes a bottom surface 138. The bottom surface 138 includes an outer edge 140 surrounding the aperture 131. The outer edge 140 in embodiments may form a beveled or partially recessed region surrounding the aperture 131. The outer edge 140 in embodiments may be chamfered at an angle of approximately forty five degrees. The bevel of the outer edge 140 substantially allows for the nut element 104 to self-center as a fastener 510 (FIG. 5C) is inserted. In some embodiments, the upper surface 110 may include a beveled region surrounding the aperture 131 (not shown). The wire 136 is configured within the channel 134 and extends through the center of the aperture 131.

Figure 7A:
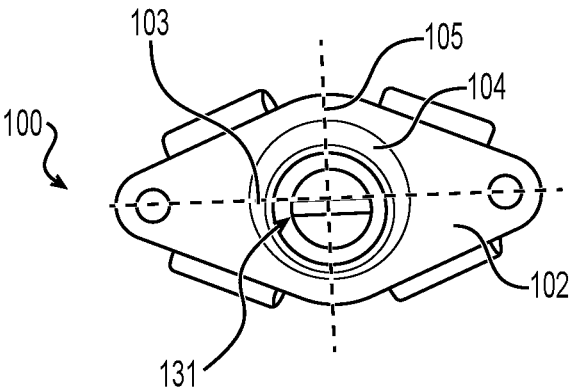
FIG. 7A is a perspective view of the nut element of FIG. 3 shifted below the major axis of the basket portion of FIG. 2.
Figure 7B:
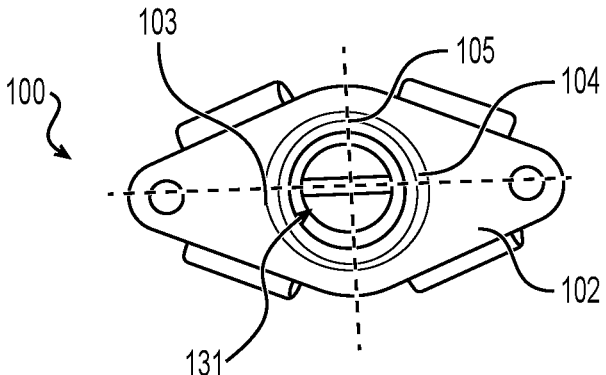
FIG. 7B is a perspective view of the nut element of FIG. 3 shifted to the left of the minor axis of the basket portion of FIG. 2.
Figure 7C:
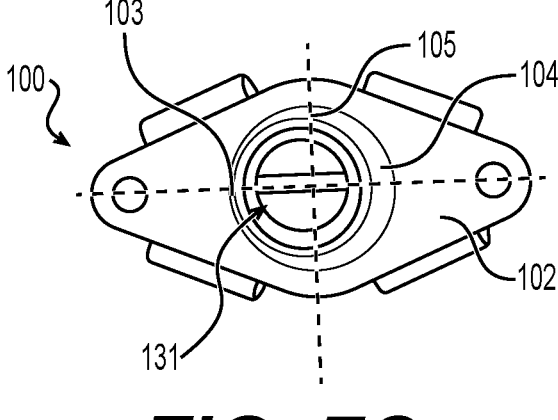
FIG. 7C is a perspective view of the nut element of FIG. 3 centrally aligned with the major axis and minor axis of the basket portion of FIG. 2.

With reference to FIG. 1, the bottom surface 138 of the nut element 104 directly contacts the upper surface 107 of the basket portion 102 when secured by the flange pairs 106A and 106B. The upper surface 107 of the basket portion 102 has a greater surface area and diameter than the nut element 104 while having a substantially similar geometric shape as the nut element 104. The flange pairs 106A and 106B are configured to extend upwards from the outer edge 108 of the basket portion 102 a greater distance than the thickness 115 of the nut element 104. Each of the flange pairs 106A and 106B are spaced such that a gap 124 is created between each pair of flanges 106A and 106B positioned on opposing sides of the basket portion 102. The length of the gap 124 between the pairs of flanges 106A and 106B is less than the length of the nut element 104. The difference in surface area between the upper surface 107 of the basket portion 102 and the bottom surface 138 of the nut element 104 and strategic positioning of the extending flange pairs 106A and 106B, substantially allows the basket portion 102 to act as a retainer for the nut element 104. The nut element 104 is able to shift on the upper surface 107 of the basket portion 102 within the bounds created by the flange pairs 106A and 106B so that the aperture 131 and the aperture 128 may be partially or fully aligned. The aperture 131 of the nut element 104 and the aperture 128 of the basket portion 102 are each positioned near the center of the nut element 104 and the basket portion 102 respectively. When the nut element 104 is loosely retained onto the basket portion 102, as shown in FIG. 1, the aperture 131 and the aperture 128 are substantially aligned with one another when the nut element 104 is shifted to the center of the basket portion 102. The aperture 131 and the aperture 128 may be partially aligned when the nut element 104 is shifted leftwards, rightwards, upwards, or downwards on the upper surface 107 of the basket portion 102 (FIGS. 7A, 7B, and 7C).

Figure 5A:
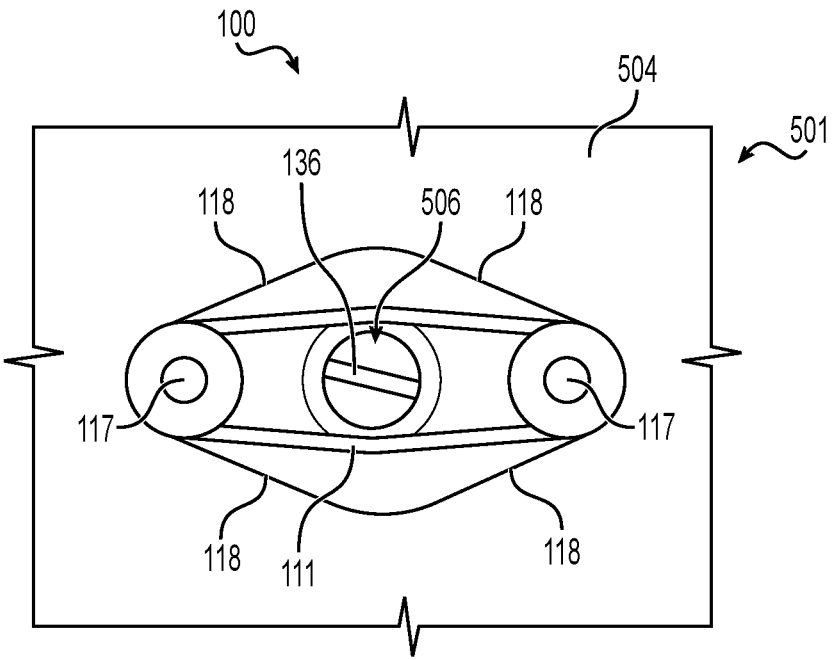
FIG. 5A is a perspective view of the front of a first sheet mounted with the nut plate fastener receptacle.

FIG. 5A shows a front surface 504 of a first sheet 501 with the nut plate fastener receptacle 100 mounted to the first sheet 501. Rivets 117 may be used to secure the nut plate fastener receptacle 100 to the first sheet 501 using the mounting holes 126. In embodiments, the bottom surface 111 of the nut plate fastener receptacle 100 is shown, such that the upper surface 110 of the nut element 104 is facing towards the first sheet 501. The nut plate fastener receptacle 100 is positioned to allow the wire 136 to extend across a first fastener hole 506. The first fastener hole 506, in embodiments, may be formed using a tool such as a drilling unit at a chosen location on the first sheet 501. The tool or method used to form the first fastener hole 506 has a known measure of tolerance or deviation.

Figure 5B:
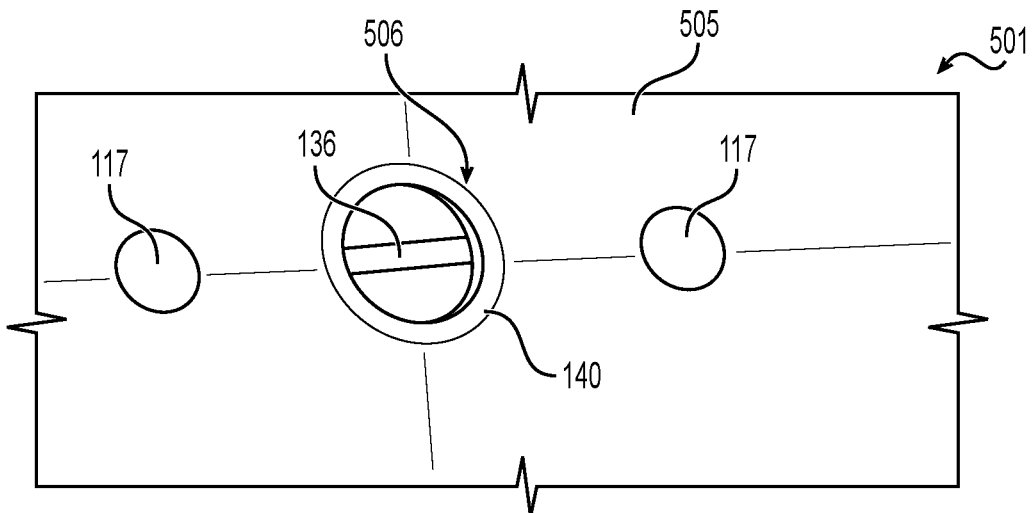
FIG. 5B is a perspective view of the rear of the first sheet mounted with the nut plate fastener receptacle.
Figure 5C:
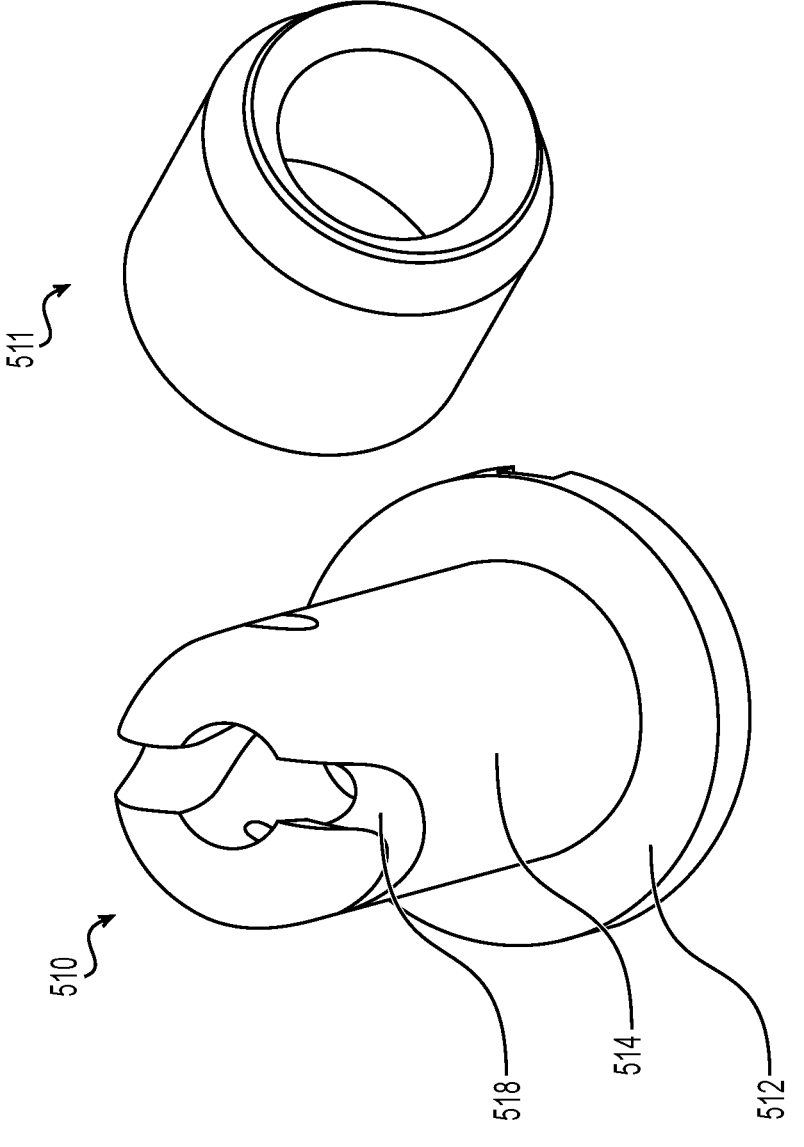
FIG. 5C is a perspective view of a fastener which may be used with the nut plate fastener receptacle.
Figure 5C:

FIG. 5B shows a rear surface 505 of the first sheet 501 with the nut plate fastener receptacle 100 mounted to the first sheet 501. The rivets 117, as shown in FIG. 5A, secure the nut plate fastener receptacle 100 to the first sheet 501. The wire 136 extends across the first fastener hole 506.

FIG. 5C shows a perspective view of the fastener 510. The fastener 510 includes a slot 518 removed from the shaft 514. The slot 518 begins at the end of the shaft 514 opposite from the fastener head 512 and spirals part of the way down the length of the shaft 514 towards the fastener head 512. The fastener 510 is configured to be inserted into the fastener stud 511 such that the slot 518 is presented and may be engaged with a wire such as wire 136. The fastener 510 is configured such that when the wire 136 inserts into the slot 518, the fastener 510, when rotated approximately a quarter turn, causes the wire 136 to be grabbed by the slot 518 and secured into the fastener 510. The fastener 510 in embodiments may be a Dzus® fastener or another type of fastener having a similar functionality and configuration.

Figure 5D:
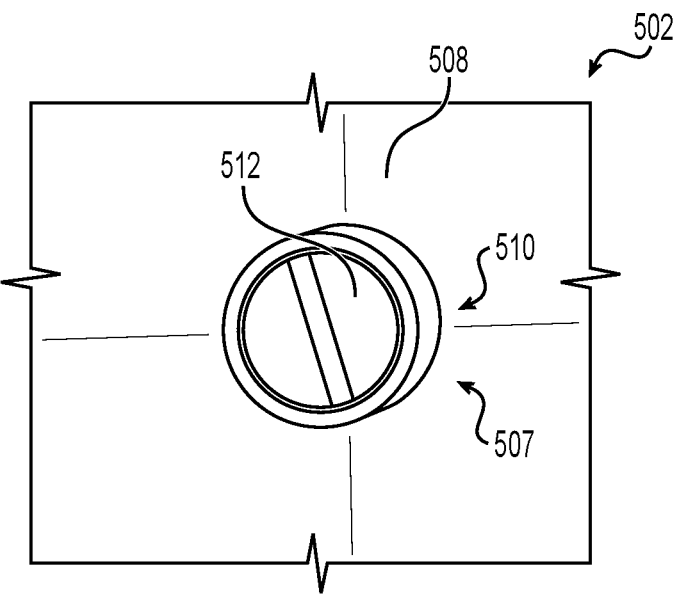
FIG. 5D is a perspective view of the front of a second sheet configured with the fastener of FIG. 5C.
Figure 5E:
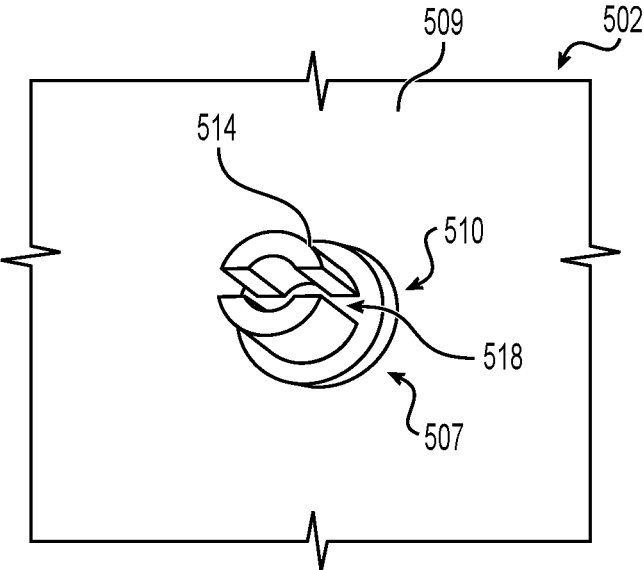
FIG. 5E is a perspective view of the rear of the second sheet configured with the fastener.

FIG. 5D shows a front surface 508 of a second sheet 502. FIG. 5E shows a rear surface 509 of the second sheet 502. The second sheet 502 includes the fastener 510 extending through a second fastener hole 507 formed into the second sheet 502. The second fastener hole 507 may be formed using similar methods used to that of the first fastener hole 506. The fastener 510 includes the fastener head 512 (FIG. 5C) protruding from the front surface 508 and a shaft 514 protruding from the rear surface 509 (FIG. 5E) of the second sheet 502.

Figure 5F:
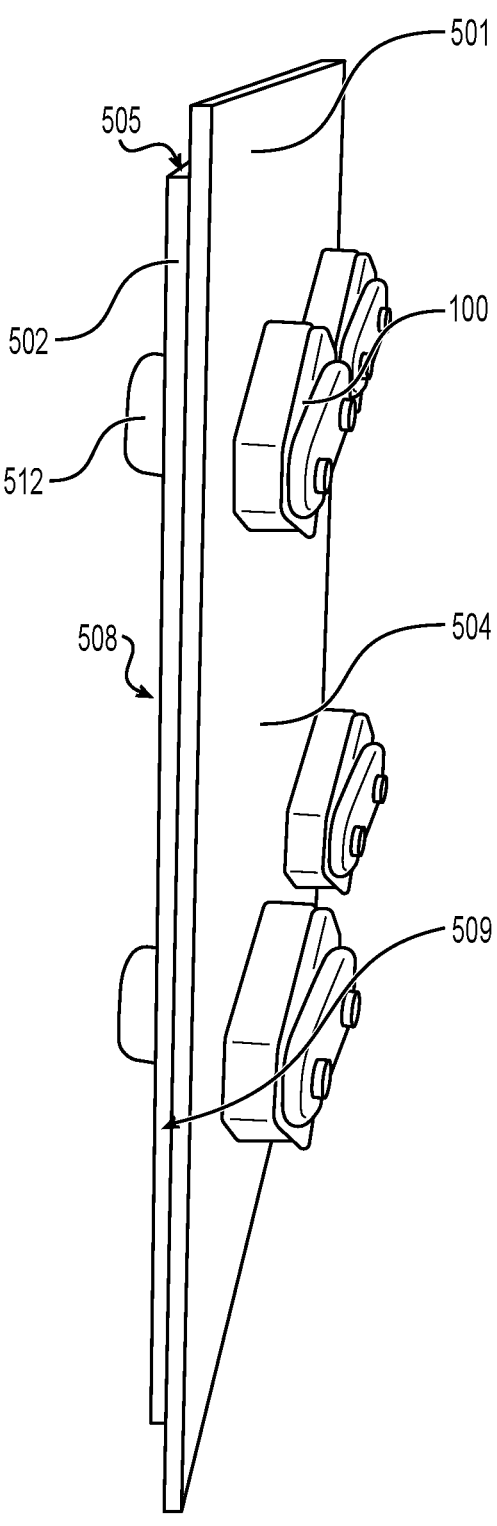
FIG. 5F is a side perspective view of the first and second sheets being joined together by the fastener and the nut plate fastener receptacle.

FIG. 5F shows a side perspective view of the first sheet 501 and the second sheet 502 secured together using the nut plate fastener receptacle 100 and the fastener 510. When the first sheet 501 and the second sheet 502 are secured together, the front surface 504 of the first sheet 501 and the front surface 508 of the second sheet 502 are each faced away from one another such that the rear surface 505 of the first sheet 501 and the rear surface 509 of the second sheet 502 each face towards and directly contact each other. The first fastener hole 506 and the second fastener hole 507 are partially or fully aligned such that the shaft 514 of the fastener 510 aligns and inserts into the first fastener hole 506 allowing the wire 136 to insert into the slot 518. In the embodiment shown in FIG. 5F, the nut plate fastener receptacle 100 is installed such that the flanges 106 are extended towards the front surface 504 of the first sheet 501. The outer edge 140 of the aperture 131 allows for the nut element 104 to substantially self-center when the fastener 510 is inserted and ensures the fastener 510 is able to latch onto the wire 136 in instances when the nut element 104 is shifted away from the center of the aperture 128 of the basket portion 102. When the fastener head 512 of the fastener 510 is rotated, the wire 136 inserts further into the slot 518 and substantially locks the fastener 510 into place such that the first sheet 501 and the second sheet 502 are secured together. In embodiments, the fastener head 512 may be rotated approximately a quarter of a full turn to adequately grab the wire 136 to become latched to the slot 518. In some embodiments, the fastener head 512 may be rotated using a tool such as a screwdriver or a drill.

Figure 6B:
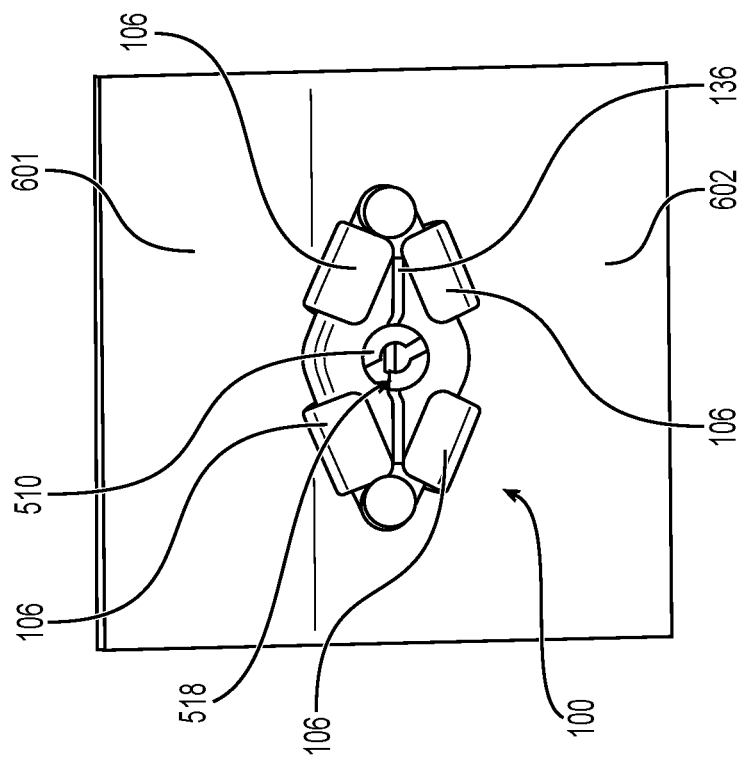
FIG. 6B is a front perspective view of the nut plate fastener receptacle of FIG. 6A with the fastener rotated a quarter turn.
Figure 6A:
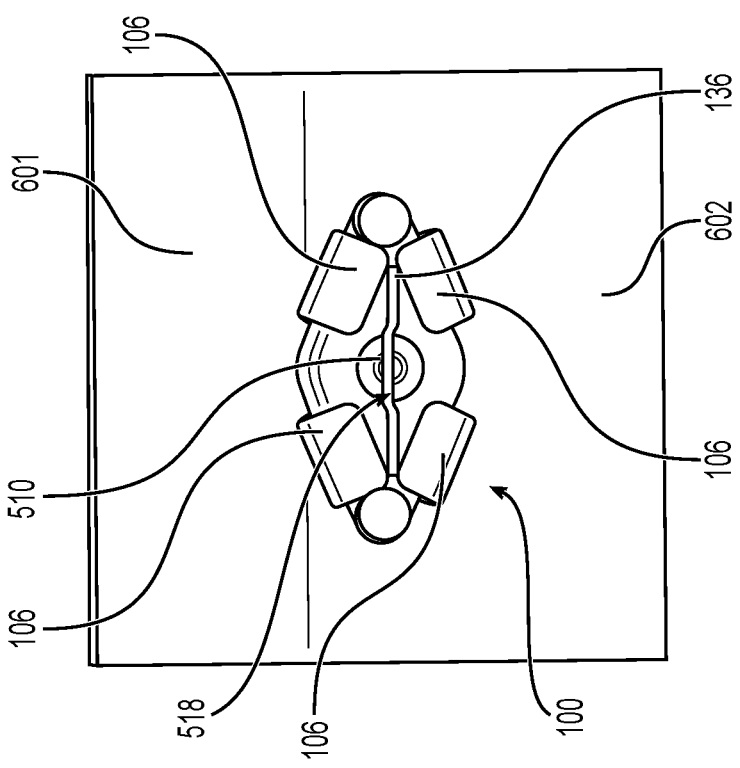
FIG. 6A is a front perspective view of the nut plate fastener receptacle joining first and second sheets together with the fastener of FIG. 5C.

FIG. 6A and FIG. 6B show a perspective view of the nut plate fastener receptacle 100 fastening a first sheet 601 to a second sheet 602. FIG. 6A shows the slot 518 of the fastener 510 engaging with the wire 136. FIG. 6B shows the fastener 510 rotated a quarter turn such that the wire 136 slides further into the slot 518 to be secured into the fastener 510. In the embodiment shown in FIGS. 6A and 6B the basket portion 102 is positioned such that the flanges 106 extend away from the second sheet 602

The first fastener hole 506 and second fastener hole 507 may each be formed into a chosen location on the first sheet 501 and second sheet 502 respectively. The method or tool used to form each hole 506 and 507 may be via a drilling unit, a handheld drill, or numerous other different hole forming techniques, some of which may be advantageous for forming a large amount of holes quickly and efficiently. The method employed to form the fastener holes 506 and 507 typically has a known measure of tolerance for forming the fastener holes 506 and 507 at a chosen location. Therefore, it is possible for the first fastener hole 506 and/or the second fastener hole 507 to be formed into either sheet 501 or 502 at a position which results in only partial alignment of the first fastener hole 506 and second fastener hole 507.

The nut plate fastener receptacle 100 is advantageous for securing sheets such as sheets 501 and 502 together due to the securement efficiency of the fastener 510 to the wire 136, and the adjustability of the nut element 104 within the basket portion 102. In FIGS. 7A and 7B the nut element 104 is shown in a position in which it is partially aligned with the basket portion 102. In FIG. 7A the nut element 104 is shifted below the major axis 103 of the basket portion 102 and in FIG. 7B the nut element 104 is shifted to the left of the minor axis 105 of the basket portion 102. FIG. 7C shows the nut element 104 centrally aligned with the major axis 103 and the minor axis 105 of the basket portion 102. When the nut plate fastener receptacle 100 is mounted to a structure (shown in FIG. 5A) the nut element 104 is able to slide within the flange pairs 106A and 106B of the basket portion 102 which allows for the wire 136 to be shifted to be properly aligned with a fastener hole such as the second fastener hole 507. In embodiments, the nut element 104 is able to shift approximately 0.035 inches between the flanges 106. In other embodiments, the nut element 104 may be loosely retained allowing the nut element 104 to shift approximately 0.01 to 0.05 inches. Typically, during manufacturing processes, fastener holes, such as the first and second fastener holes 506 and 507 formed into each sheet such that one fastener hole is configured with a receiving element such as the nut plate fastener receptacle 100 and the other fastener hole is configured with a driving element such as the fastener 510. The first fastener hole 506 and the second fastener hole 507 are typically removed from the first sheet 501 and second sheet 502 at calculated positions such that each hole 506 and 507 aligns with one another for structures to be fastened together. The nut plate fastener receptacle 100 allows for fastener holes 506 and 507 to have a greater range of deviation due to the adjustability of the nut element 104 to shift or slide and allow the wire 136 to align with a fastener 510 only in partial alignment with the first fastener hole 506.

In embodiments, the nut plate fastener receptacle 100 may be used to fasten together different structures including flight control panels or instrument panels on an aircraft. In other embodiments, the nut plate fastener receptacle 100 may be used to fasten together other structures on an aircraft, automobile, or other structure. FIGS. 5A-5E show the nut plate fastener receptacle 100 being used with a fastener to secure a first sheet 501 to a second sheet 502. The nut plate fastener receptacle 100 may be fabricated from an electrically conductive material to release static charge and prevent static from building up.

Many different arrangements of the various components depicted, as well as components not shown, are possible without departing from the spirit and scope of what is claimed herein. Embodiments have been described with the intent to be illustrative rather than restrictive. Alternative embodiments will become apparent to those skilled in the art that do not depart from what is disclosed. A skilled artisan may develop alternative means of implementing the aforementioned improvements without departing from what is claimed.

It will be understood that certain features and subcombinations are of utility and may be employed without reference to other features and subcombinations and are contemplated within the scope of the claims. Not all steps listed in the various figures need be carried out in the specific order described.

The invention claimed is:

1. A floating nut plate quarter turn fastener receptacle, comprising:
    a basket portion having a first aperture and a plurality of flanges, wherein the first aperture is centrally located through the basket portion and the plurality of flanges extend upwards from an outer edge of the basket portion;
    a nut element having a second aperture and a channel, wherein the second aperture is centrally located through the nut element and the channel extends longitudinally through the nut element,
    the nut element being secured within the flanges of the basket portion such that the second aperture substantially aligns with the first aperture, the flanges being configured to allow the nut element to be loosely retained upon the basket portion between the flanges; and
    a wire inserted into the channel, wherein the wire is configured to receive a slot of a fastener.

2. The nut plate fastener receptacle of claim 1, wherein each flange of the plurality of flanges comprises:
    a first portion extending laterally away from the basket portion;
    a second portion extending from the first portion upwards relative to the basket portion; and
    a third portion extending from the second portion laterally towards the basket portion, such that the third portion extends over the basket portion with a gap therebetween.

3. The nut plate fastener receptacle of claim 1, wherein the basket portion comprises a major axis aligned in a longitudinal direction, and the plurality of flanges includes a first flange pair on a first side of the major axis and a second flange pair on a second side of the major axis opposite the first side.

4. The nut plate fastener receptacle of claim 3, wherein the basket portion comprises rivet holes on distal ends of the basket portion along the major axis of the nut plate fastener receptacle.

5. The nut plate fastener receptacle of claim 3, wherein each flange of the first flange pair extends from the basket portion directly opposite from a corresponding one of the second flange pair.

6. The nut plate fastener receptacle of claim 1, wherein the first aperture and second aperture are configured to receive the fastener, and the wire is configured to be received into a slot of the fastener.

7. The nut plate fastener receptacle of claim 1, wherein the fastener is configured to be twisted such that the wire is inserted into the slot as the fastener is rotated upon insertion into the first and second apertures.

8. The nut plate fastener receptacle of claim 1, wherein the basket portion and the nut element comprise an electrically conductive material.

9. The nut plate fastener receptacle of claim 3, wherein the gap between the third portion of each flange and the basket portion is configured to receive the nut element such that the nut element is loosely retained within the plurality of flanges for aligning the second aperture with the first aperture as the fastener is inserted.

10. A floating nut plate quarter turn fastener receptacle, comprising:

a basket portion wherein the basket portion includes a first pair of flanges, a second pair of flanges, and a first aperture;

a nut element wherein the nut element includes a channeled groove and a second aperture;

a wire wherein the wire is fit into the channeled groove and intersects the second aperture, wherein the wire is configured to be grabbed by a slot in the fastener as the fastener is inserted through the first and second apertures and twisted a quarter turn; and the first pair of flanges being opposed to the second pair of flanges such that the nut element is retained within the first and second pairs of flanges.

11. The nut plate fastener receptacle of claim 10 wherein the nut element is loosely retained in between the first and second pairs of flanges to align the second aperture and the first aperture.

12. The nut plate fastener receptacle of claim 10, wherein the first and second pairs of flanges are curvedly shaped to partially wrap over an upper surface of the nut element.

13. The nut plate fastener receptacle of claim 12, wherein the first and second pairs of flanges extend away from the basket portion such that an inner diameter of the curved shape is a greater distance than a thickness of the nut element.

14. The nut plate fastener receptacle of claim 10, wherein the first pair of flanges includes a first gap in between each flange and the second pair of flanges includes a second gap in between each flange, wherein the first gap is substantially equivalent to the second gap and the first and second gaps are bigger than a thickness of the nut element.

15. The nut plate fastener receptacle of claim 10, wherein the first aperture of the basket portion is configured to be aligned with a fastener hole on a structure.

16. The nut plate fastener receptacle of claim 15, wherein the basket portion comprises rivet holes positioned on opposing ends of the basket portion, and the basket portion is configured to be secured to the structure via rivets inserted through the rivet holes.

17. The nut plate fastener receptacle of claim 10, wherein the nut element is elliptically shaped and the channeled groove is aligned with a major axis of the nut element, and the basket portion is elliptically shaped such that the wire is aligned with a major axis of the basket portion due to the nut element being centrally positioned between the first and second pairs of flanges.

18. The nut plate fastener receptacle of claim 10, wherein the receptacle is configured such that rivets can be riveted to a first sheet and the wire is configured to grab a fastener for fastening a second sheet to the first sheet.

\* \* \* \* \*